United States Patent
Carruthers et al.

(10) Patent No.: US 7,030,338 B2
(45) Date of Patent: Apr. 18, 2006

(54) PHARMACEUTICAL LASER DRILLING SYSTEM

(75) Inventors: Mark S. Carruthers, Old Saybrook, CT (US); Christopher D. Craig, Bend, OR (US); Douglas L. Millard, Bend, OR (US); David D. Newbold, Bend, OR (US); Kenny R. Spence, Bend, OR (US); Avinash G. Thombre, East Lyme, CT (US)

(73) Assignee: Pfizer, Inc., Groton, CT (US)

( * ) Notice: Subject to any disclaimer, the term of this patent is extended or adjusted under 35 U.S.C. 154(b) by 74 days.

(21) Appl. No.: 10/625,949

(22) Filed: Jul. 23, 2003

(65) Prior Publication Data

US 2005/0067385 A1   Mar. 31, 2005

Related U.S. Application Data

(60) Provisional application No. 60/398,431, filed on Jul. 24, 2002.

(51) Int. Cl.
*B23K 26/38* (2006.01)
*B23K 26/03* (2006.01)

(52) U.S. Cl. .................. 219/121.7; 219/121.82; 219/121.83

(58) Field of Classification Search ........... 219/121.7, 219/121.71, 121.83, 121.84, 121.82
See application file for complete search history.

(56) References Cited

U.S. PATENT DOCUMENTS

| | | | | |
|---|---|---|---|---|
| 4,027,137 | A * | 5/1977 | Liedtke | 219/121.7 |
| 4,088,864 | A * | 5/1978 | Theeuwes et al. | 219/121.71 |
| 4,281,764 | A | 8/1981 | Fowler, Jr. | 209/557 |
| 5,085,510 | A * | 2/1992 | Mitchell | 356/237.1 |
| 5,359,176 | A * | 10/1994 | Balliet et al. | 219/121.84 |
| 5,363,968 | A | 11/1994 | Soloman | 209/546 |
| 5,399,828 | A | 3/1995 | Riddle et al. | 219/121.7 |
| 5,624,587 | A * | 4/1997 | Otsuki et al. | 219/121.83 |
| 5,658,474 | A | 8/1997 | Geerke | 219/121.71 |
| 5,698,119 | A | 12/1997 | Geerke | 219/121.7 |
| 6,276,512 | B1 * | 8/2001 | Geerke et al. | 198/395 |
| 6,452,133 | B1 * | 9/2002 | Geerke et al. | 219/121.82 |
| 6,756,564 | B1 * | 6/2004 | Tian | 219/121.71 |
| 6,785,414 | B1 * | 8/2004 | McStravick et al. | 382/162 |
| 6,809,288 | B1 * | 10/2004 | Faour | 219/121.7 |
| 2003/0189030 | A1 * | 10/2003 | Faour | 219/121.7 |
| 2004/0094050 | A1 * | 5/2004 | Ackley et al. | 101/44 |

* cited by examiner

*Primary Examiner*—Geoffrey S. Evans
(74) *Attorney, Agent, or Firm*—Greg C. Benson; Robert M. Kennedy; Pfizer Patent Department

(57) ABSTRACT

A laser drilling system forms an opening in the coating of a pharmaceutical dosage form and includes an orienting assembly to correctly orient dosage forms, a debris removal assembly to reduce buildup of and reduce exposure to drilling debris and a quality control assembly to verify that the opening formed conforms to predetermined specifications.

4 Claims, 9 Drawing Sheets

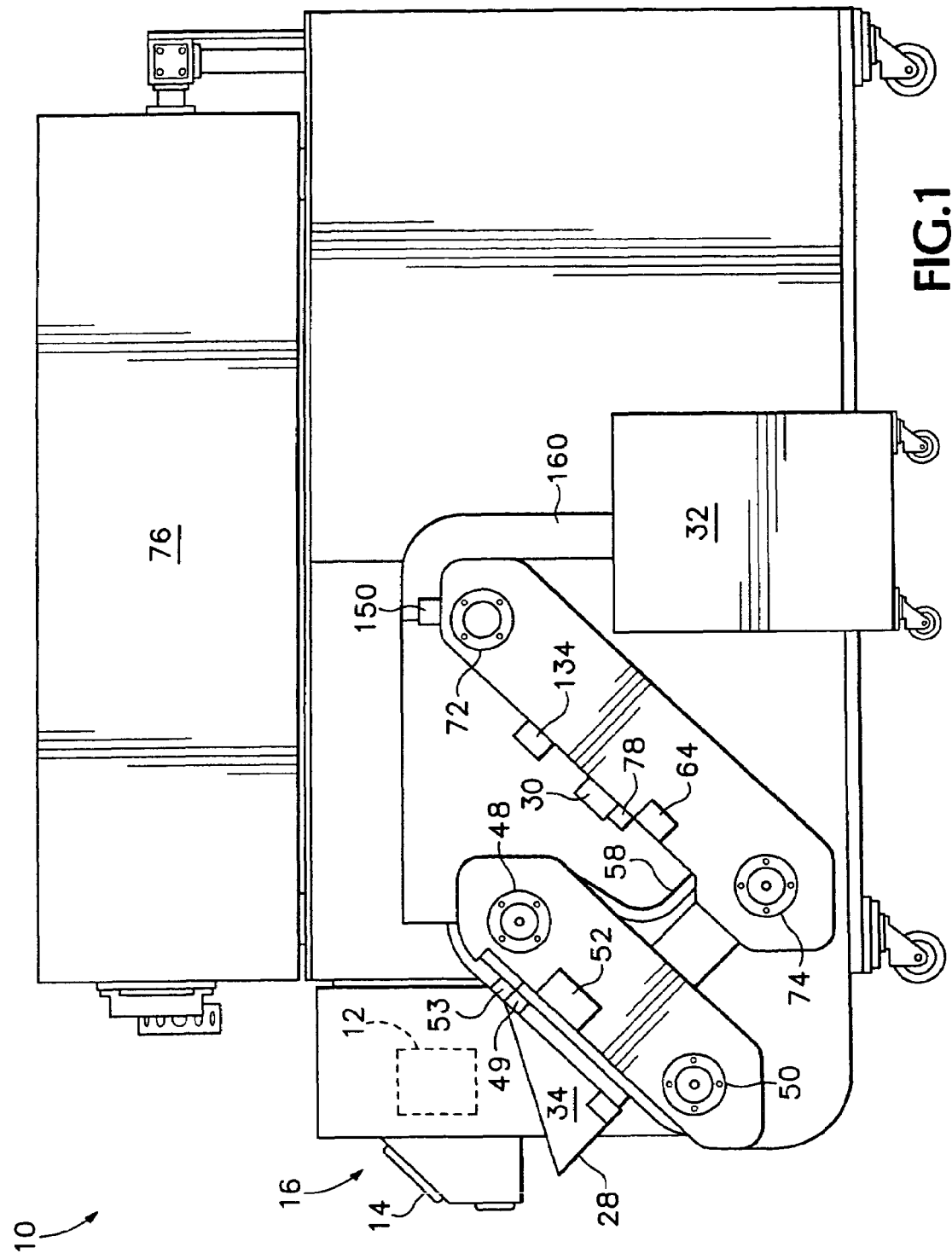

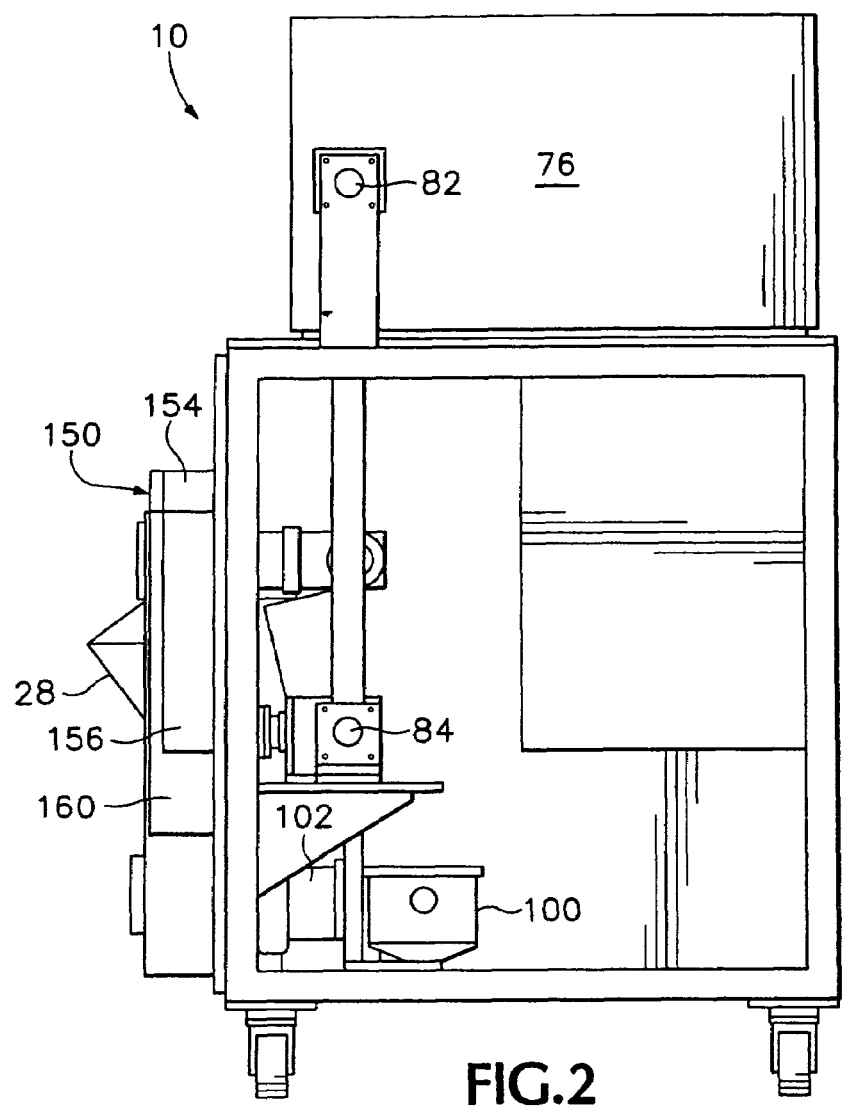
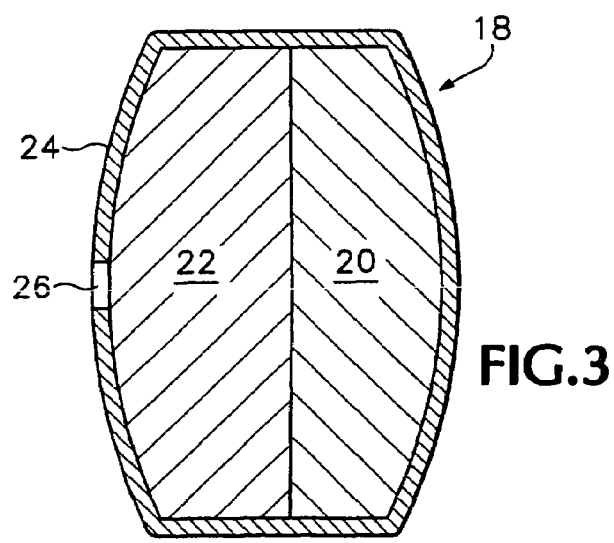

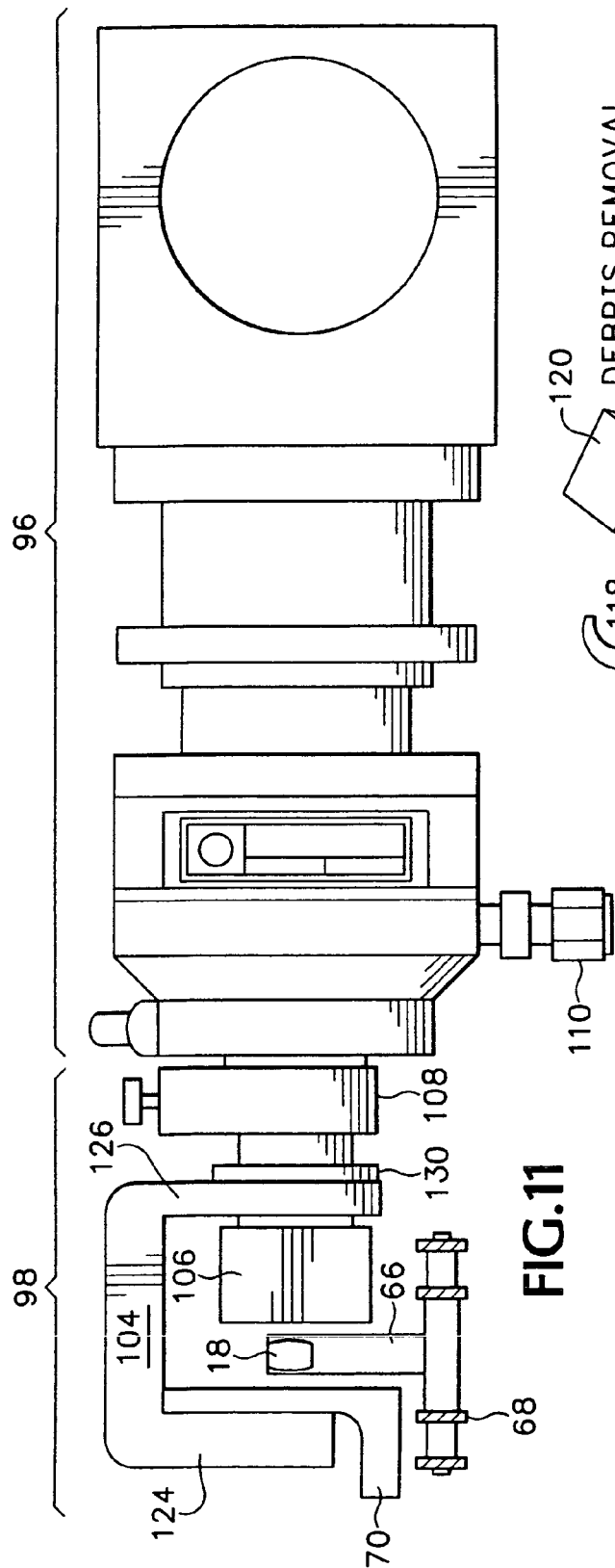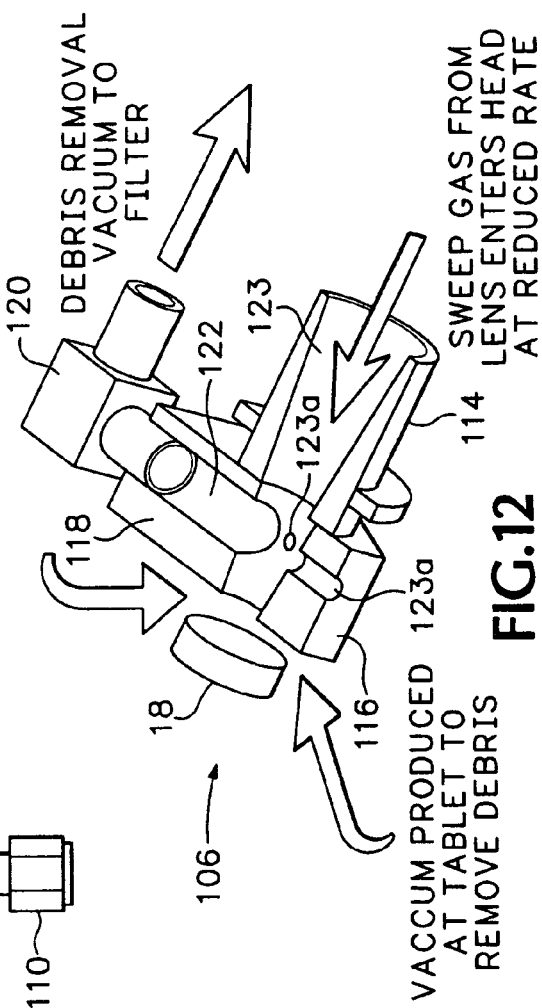

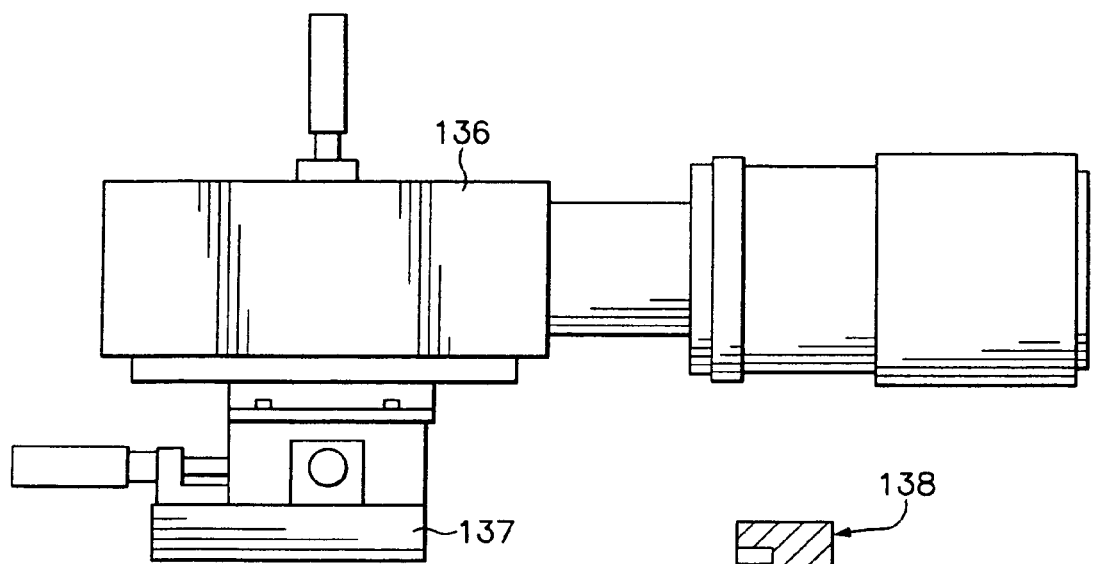
FIG.13
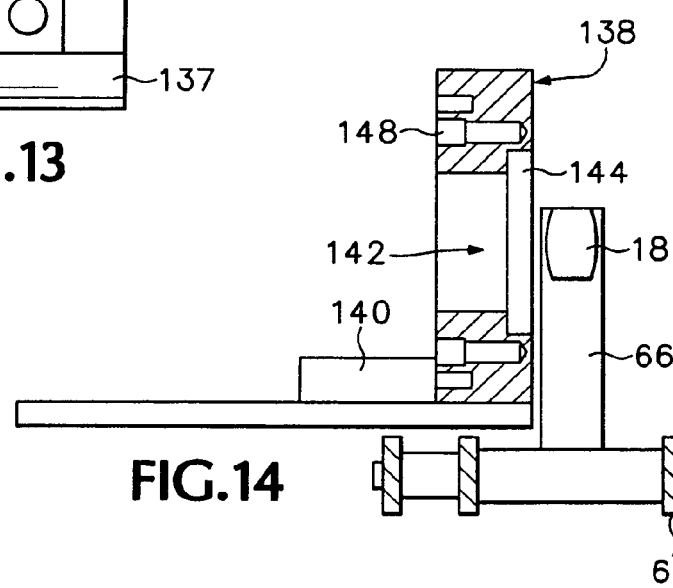
FIG.14
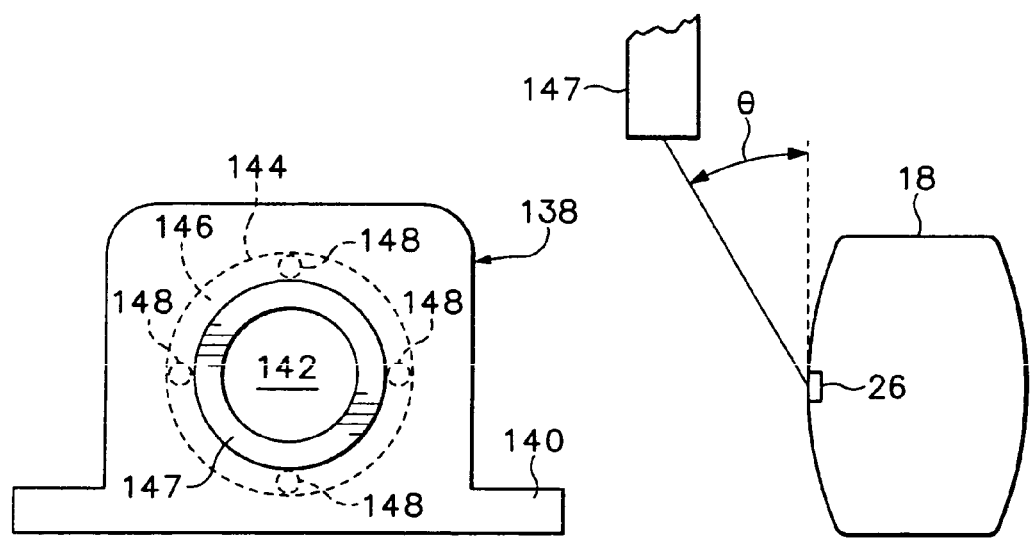
FIG.15
FIG.16

PHARMACEUTICAL LASER DRILLING SYSTEM

CROSS REFERENCE TO RELATED APLICATIONS

This application claims the benefit of U.S. Provisional Patent Application No. 60/398,431 filed Jul. 24, 2002.

BACKGROUND OF THE INVENTION

One method for providing controlled release of a drug is to provide a coating surrounding a core containing the drug. Some or all of the components of the core, including the drug, are released through one or more openings or drug delivery ports formed in the coating. Such controlled release dosage forms typically utilize osmotic pressure, diffusion or surface hydration to deliver the core's drug contents through the delivery ports.

One such controlled-release dosage form is a coated tablet having a core of two layers. One layer of the core contains drug and is in communication with an opening through the coating. The other layer is a sweller layer containing a swelling agent. The bi-layer core is surrounded by a semipermeable coating. When introduced to an environment of use, water permeates through the coating to cause the swelling agent to expand, which in turn causes the drug-containing layer to be extruded through the opening into the environment of use.

It is well known to form an opening through a pharmaceutical coating using a laser. Examples of such systems are disclosed in U.S. Pat. Nos. 5,698,119, 5,658,474 and 5,399,828. The '828 patent describes a laser drilling system for use in forming an opening through the coating of a bi-layer tablet. The two layers are of different colors. The system uses a side detector to determine which side of the tablet contains the drug, then directs one of two lasers to drill through the coating on that side. Although this system is capable of accurately determining the correct side of the tablet to drill, it has no means of verifying that the tablet has in fact been drilled to the specified opening and that the opening is completely through the coating. If the opening is incomplete, of the wrong size, or otherwise different than that specified, the release rate of the drug may be altered.

The use of a laser to form the opening through a tablet coating causes portions of the coating and potentially the drug core to be vaporized or otherwise expelled from the tablet. It is desirable to remove this debris to limit buildup of debris within the system, to minimize interference with the laser, and to reduce exposure of operators to the debris. In addition, it is desired to accomplish these functions at relatively high rates of speed for purposes of automation.

What is therefore needed is a pharmaceutical laser drilling system that is not only automated and capable of drilling the correct side of a tablet, but that is also capable of accurately determining the completeness and correctness of drilling, that removes debris generated during the drilling process, and that is capable of processing tablets at a high rate of speed.

BRIEF SUMMARY OF THE INVENTION

In a first aspect of the invention, the pharmaceutical laser drilling system provides a mechanical handing assembly to properly orient the dosage forms for drilling. The handling assembly comprises two separate link conveyors in series to transport the dosage forms. Each link conveyor transports the dosage forms to a color sensor to sense the color of at least one side of the dosage form to determine whether the dosage form is positioned correctly for drilling.

In a second aspect of the invention, the pharmaceutical laser drilling system provides a debris removal assembly that incorporates an enclosure extending from a laser lens assembly to the dosage form being drilled, which allows the lens assembly to remain debris-free and capable of focusing a laser beam.

In a third aspect of the invention, the pharmaceutical laser drilling system provides a quality control assembly for checking each dosage form following drilling to ensure that the opening was correctly and completely formed.

BRIEF DESCRIPTION OF THE SEVERAL VIEWS OF THE DRAWINGS

FIG. 1 is a side view of an exemplary pharmaceutical laser drilling system of the invention.

FIG. 2 is an end view of the system of FIG. 1 with a rear panel removed to show the interior of the system.

FIG. 3 is a cross-sectional view of an exemplary bi-layer tablet.

FIG. 11 is a side view of the assembled debris enclosure and lens assembly.

FIG. 12 is a perspective schematic of the debris removal head and surrounding environment.

FIG. 13 is a side view of the quality control assembly of the system.

FIG. 14 is a cross-sectional view of the illumination source of the quality control assembly of FIG. 13.

FIG. 15 is a front view of the illumination source of FIG. 14.

FIG. 16 is a side view showing the angle between the light ring of the quality control assembly and an illuminated dosage form.

DETAILED DESCRIPTION OF PREFERRED EMBODIMENTS

Figure 4:
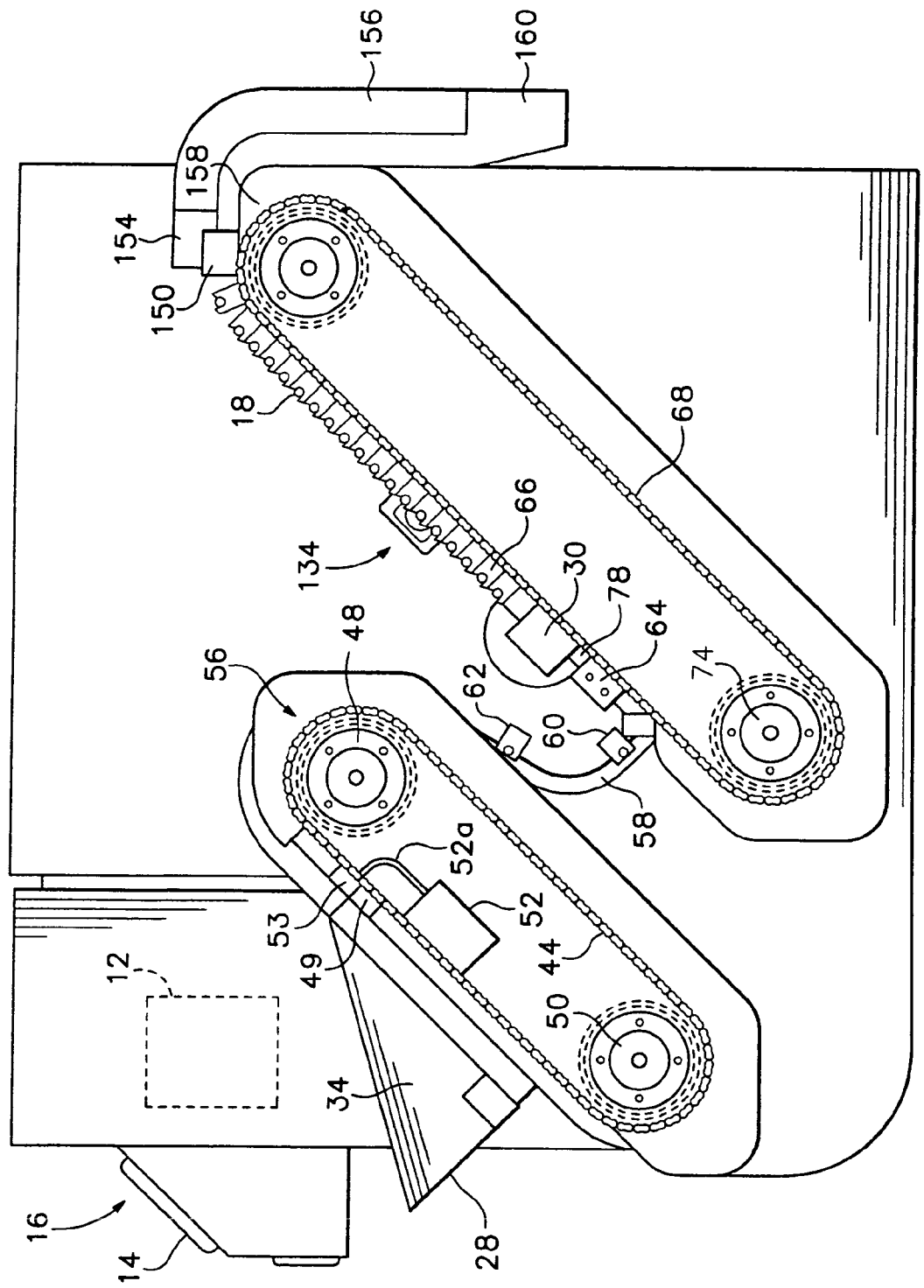
FIG. 4 is a partial view of the system of FIG. 1 showing details of the first and second link conveyors.
Figure 5:
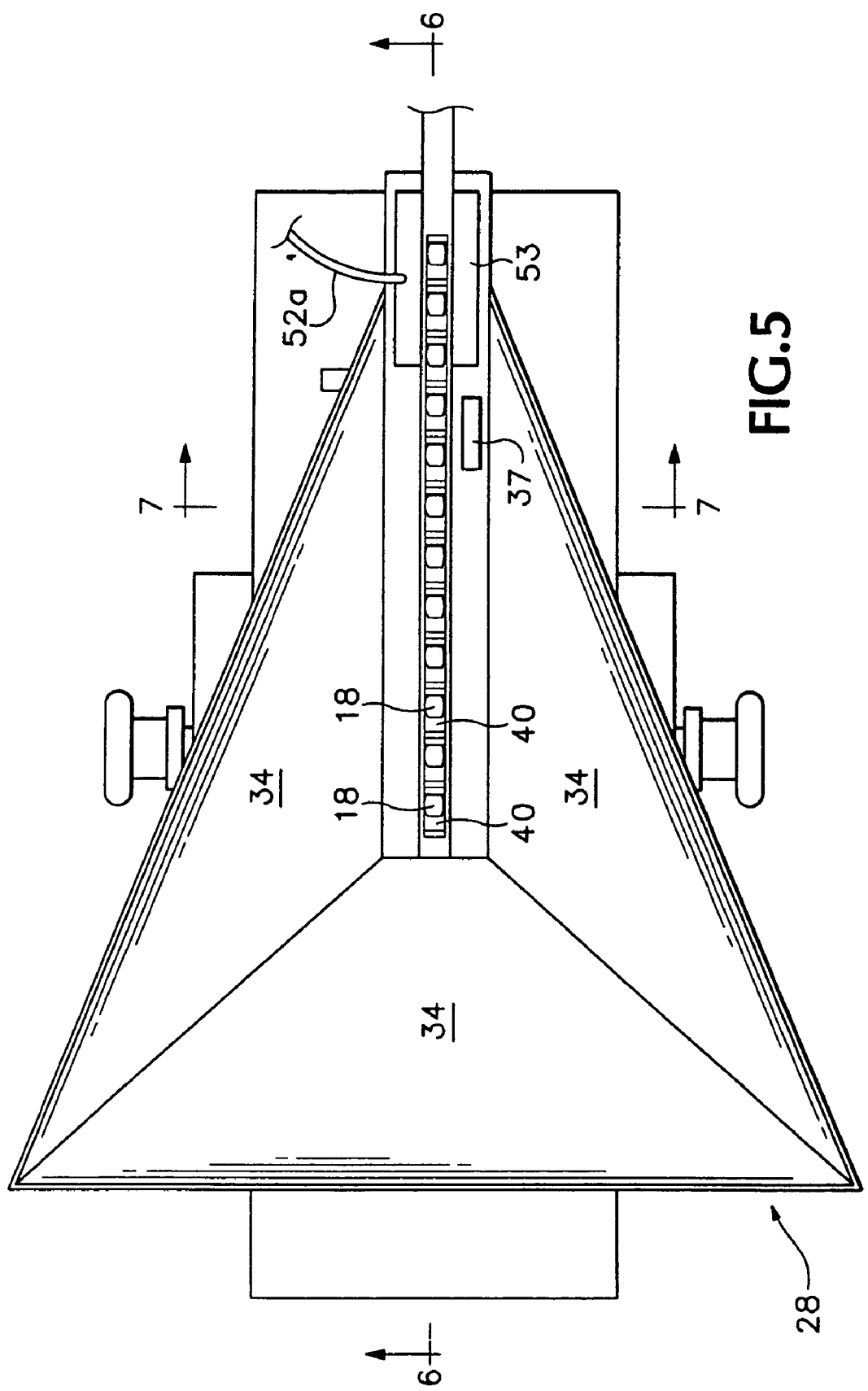
FIG. 5 is a plan view of the feed hopper of the system of FIG. 1.
Figure 6:
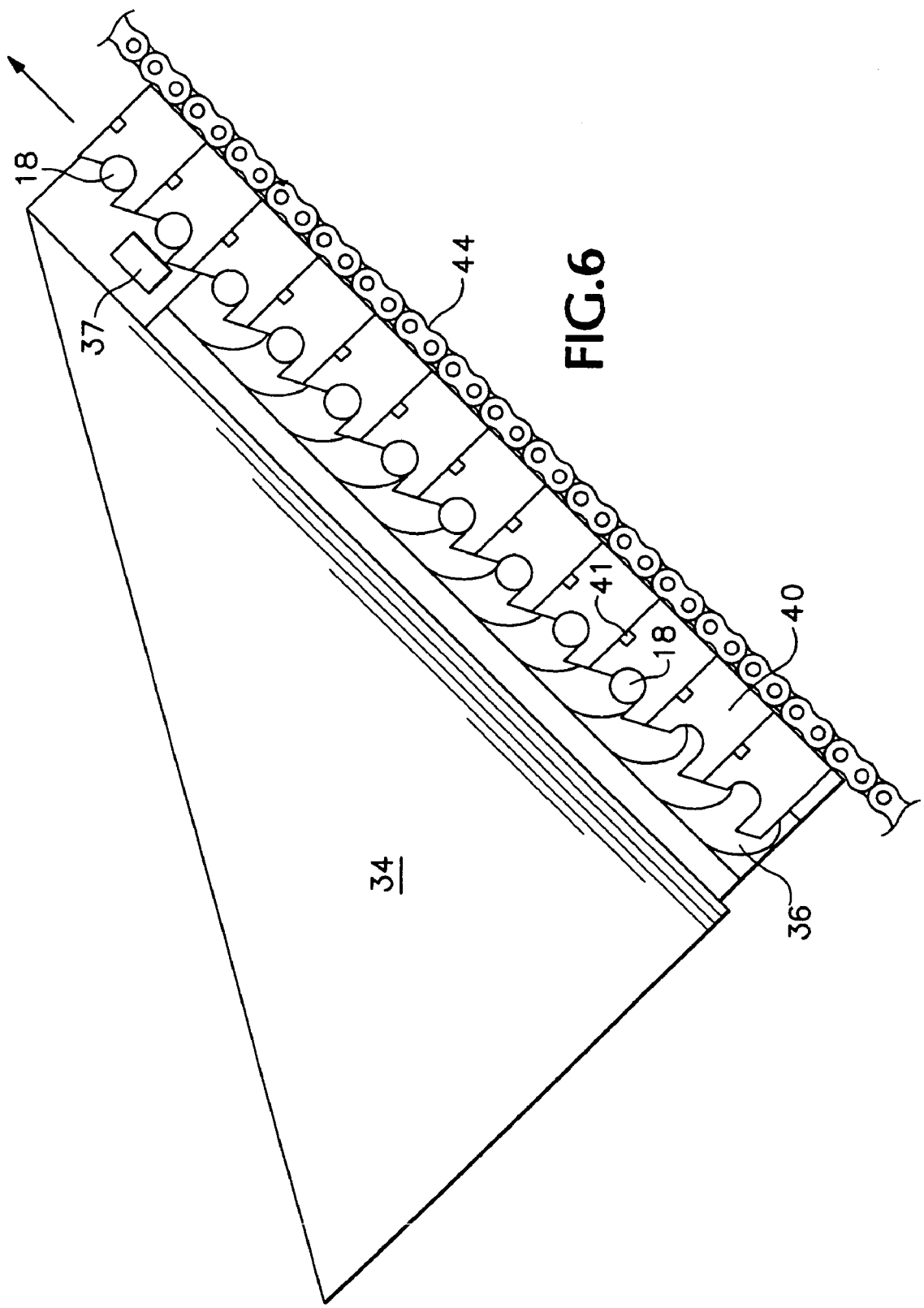
FIG. 6 is a sectional view taken through the plane 6—6 of FIG. 5.
Figure 7:
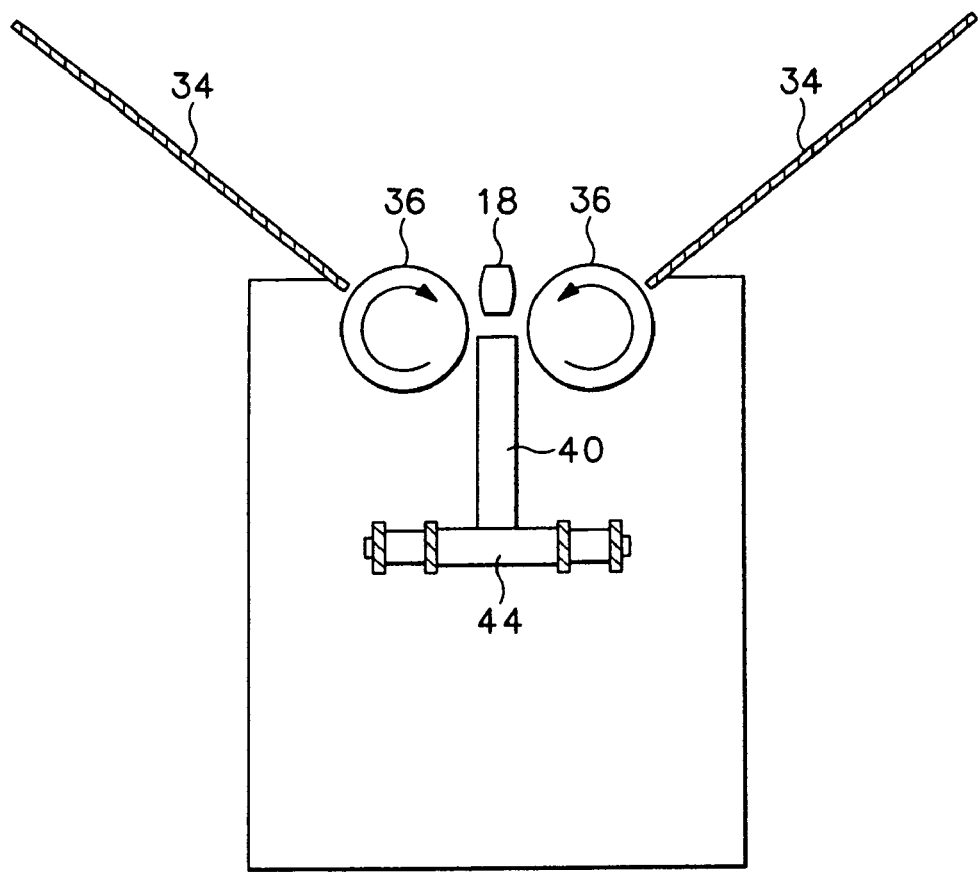
FIG. 7 is a sectional view taken through the plane 7—7 of FIG. 5.

Referring to the drawings, wherein like numerals refer to the same elements, FIG. 1 shows a laser drilling system 10 for drilling openings through the coating of a pharmaceutical dosage form. The laser-drilling system of the invention consists of four main assemblies: a dosage form handling assembly, which positions the dosage forms for drilling; a laser beam delivery assembly, which creates the openings or delivery ports through the dosage form coating; a debris-removal assembly, which removes debris and waste gases created by the drilling; and a quality control assembly, which verifies that the delivery ports in the dosage forms have been drilled correctly.

The laser drilling system of the invention includes an onboard programmable logic controller (PLC) 12 which manages the entire laser drilling process. The PLC displays information on a touchscreen 14 of control panel 16, which is located at one end of the system 10. Operation of the laser drilling system is controlled via touchscreen 14.

The laser drilling system may be used to create an opening or drug delivery port through the coating of any pharmaceutical dosage form, and is capable of drilling on one side only of a coated tablet having a drug-containing core of virtually any configuration. An exemplary dosage form suitable for use with the inventive pharmaceutical laser drilling system is a coated tablet having a drug-containing core that is either a homogeneous mixture or comprises granules of material interspersed throughout the core. Another suitable exemplary dosage form is a coated tablet having a central swellable core surrounded by a drug-containing core. Yet another suitable exemplary dosage form is a coated three layer tablet having a central swellable layer sandwiched between two drug-containing layers. A particularly preferred dosage form suitable for use with the present invention is a coated tablet having two layers within the tablet core; FIG. 3 shows a cross-sectional view of such a bi-layer core tablet 18. Typically, the sweller layer 20 is of a different color than the drug-containing layer 22. For example, the sweller layer 20 may contain both a swelling agent and a dye, while the drug-containing layer 22 may be white or some other contrasting color. A semipermeable coating 24 is applied to these bi-layer tablets before creating the opening 26.

While the laser drilling system is described herein in terms of a particular combination of assemblies and subassemblies, several aspects of the system, particularly its debris-removal and quality control assemblies, are broadly applicable to pharmaceutical drilling systems of other designs.

Referring to FIGS. 1 and 4, the dosage form handling assembly of the pharmaceutical laser drilling system of the invention transports the dosage forms from feed hopper 28 to laser station 30 for drilling, and then to collection hopper 32. For applications where the dosage form is to be drilled on a particular side, the dosage form handling system checks the orientation of the dosage forms and transports for drilling only properly oriented dosage forms.

Referring to FIGS. 4–7, feed hopper 28 is located at one end of the laser drilling system. Feed hopper 28 has inclined walls 34 which converge toward each other at the bottom of the feed hopper. The bottom of the feed hopper is joined to a first link conveyor. As shown more particularly in FIGS. 5–7, feed hopper 28 and the first link conveyor are arranged so that the dosage forms funnel to the bottom of the feed hopper to be loaded into the first link conveyor. Two rotating spindles 36 located at the bottom of feed hopper 28 (see FIG. 7) turn to agitate and orient the dosage forms.

Figure 8:
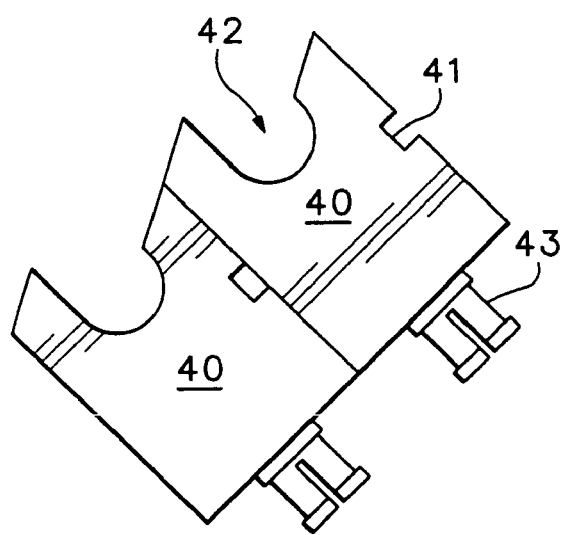
FIG. 8 is a side view of a pair of links in the first link conveyor.

The first link conveyor initially sorts the dosage forms and transports them out of feed hopper 28 to a second link conveyor. First link conveyor comprises a plurality of conveyor links 40 designed to hold and transport dosage forms of a specific size. Such links are well known in the art and are available from RW Hartnett of Philadelphia, Pa. FIG. 8 shows a side view of an exemplary pair of links 40. Links 40 have an opening 42 for receiving dosage form 18 and a stem 43 which is insertable into a socket in drive chain 44. Each link 40 is sized and shaped to allow dosage form 18 to drop into opening 42 as the link passes through feed hopper 28, and to hold the dosage form securely so that the orientation of the dosage form within the link 40 will not change as the dosage form is transported. Air inlet port 37 located near the top of feed hopper 28 directs an air stream downwardly at the dosage forms in the first link conveyor to dislodge dosage forms which have been picked up by the first link conveyor, but which are not properly seated in an opening 42 of a link 40. Drive chain 44 of the first link conveyor is driven by a motor 48 on one end and rotates freely on the other end around a fixed pulley 50. Motor 48 is operatively connected to PLC 12 so as to allow the PLC to control movement of the first link conveyor. A guard panel surrounds a portion of chain 38, which keeps the dosage forms from falling out of links 40 as the links rotate around the underside of the conveyor.

The first link conveyor includes an indexing sensor 49. As shown in FIG. 8, each link 40 has a sensor notch 41 formed in its side. Indexing sensor 49 is positioned adjacent to the first link conveyor to determine when a sensor notch 41 is present. Data from indexing sensor 49 is sent to PLC 12 to coordinate movement of the first link conveyor and to trigger first color sensor 52 at the appropriate time. The first link conveyor transports loaded dosage forms 18 from the bottom of feed hopper 28 to first color sensor 52 located near the top of the feed hopper. First color sensor 52 is operatively connected to PLC 12 to send data to the PLC that is representative of the color of the layer of the dosage form facing the color sensor. In response to a signal from PLC 12, first color sensor 52 is triggered to determine whether the dosage form is properly oriented for drilling, e.g., that the drug-containing layer of a bi-layer tablet is facing the laser. First color sensor 52 is an optical device capable of determining, for example, whether the colored or white side of a dosage form is facing the sensor. An exemplary color sensor is a CS1-P1111 available from SICK, Inc. of Minneapolis, Minn. First color sensor 52 includes a fiber optic cable 52a extending from the color sensor to the first link conveyor.

If the dosage form is oriented incorrectly, a first rejection station 53 located near the top of feed hopper 28 is activated by PLC 12 to eject the dosage form from the first link conveyor. First rejection station 53 may be any device capable of removing the dosage form from link 40 in response to data received from first color sensor 52, but a preferred embodiment utilizes a selectively controllable air jet port (not shown) located beneath links 40. As the link 40 containing the incorrectly oriented dosage form passes over the air jet port, a short burst of air ejects the dosage form. In the embodiment shown, the dosage form is ejected back into the bottom of feed hopper 28 to be loaded again into the first link conveyor.

The first link conveyor transports correctly oriented dosage forms out of feed hopper 28 and around the top end 56 of the first link conveyor. Dosage forms then drop out of links 40 into a transfer sleeve 58. Transfer sleeve 58 transfers the dosage forms from the first link conveyor to a second link conveyor. In typical operation, the first link conveyor is operated at about twice the dosage form handling rate than that of the second link conveyor. Because of this, and since the dosage forms are randomly oriented when loaded into links 40, only about half of the links contain a properly oriented dosage form after passing first rejection station 53. Transfer sleeve 58 enables the loading of dosage forms into the second link conveyor and coordinates the processing rates of the first and second link conveyors.

Dosage form sensor 60 is operatively connected to PLC 12 and positioned adjacent to the bottom of transfer sleeve 58 to determine whether sufficient dosage forms are present to allow them to be loaded into the second link conveyor. The second link conveyor does not begin to move until at least several dosage forms, e.g., three, are present at the bottom of transfer sleeve 58 for loading into the second link conveyor. This feature prevents the shearing of dosage forms that might otherwise result if dosage forms were transferred without interruption from transfer sleeve 58 to a moving second link conveyor. In addition, by queuing dosage forms in the transfer sleeve 58, each link 66 in the second link conveyor is loaded with a dosage form even though only half of links 40 in the first link conveyor contains a properly oriented dosage form.

Transfer sleeve 58 also includes a sleeve full sensor 62 (FIG. 4) mounted near the top of transfer sleeve 58. Sleeve full sensor 62 is operatively connected to PLC 12 to send a signal to the PLC when transfer sleeve 58 is fully loaded with dosage forms. If sleeve full sensor 62 determines that transfer sleeve 58 is full, the first link conveyor is stopped by the PLC to allow the second link conveyor to catch up.

The second link conveyor includes a redundant second color sensor 64 to recheck the orientation of the dosage forms. The second link conveyor holds the dosage forms securely while they are drilled, inspected, and then accepted or rejected. Like the first link conveyor, the second link conveyor comprises a plurality of links 66 mounted to a drive chain 68. Drive chain 68 is driven by motor 72 at one end and freely rotates around fixed pulley 74 at the other end. Motor 72 is operatively connected to PLC 12 to allow the PLC to control movement of the second link conveyor. The laser drilling process is capable of causing unsecured dosage forms to move during drilling. This may lead to incomplete drilling or formation of an ill-defined opening. Accordingly, links 66 in the second link conveyor preferably have a tighter tolerance in their openings for receiving the dosage forms so as to hold them more securely during the drilling process so as to ensure the formation of a clean, complete opening in the coating.

The second link conveyor transports the dosage forms from the bottom of transfer sleeve 58 to second color sensor 64. Second color sensor 64 checks to see that the dosage forms are oriented correctly in the second link conveyor. Second color sensor 64 is operatively connected to PLC 12 and sends a signal to the PLC representative of the color of the layer facing second color sensor 64. In the embodiment shown in FIG. 4, second color sensor 64 verifies the dosage form orientation by viewing the side of the dosage form opposite to that viewed by first color sensor 52. This combination of color sensors, in which first color sensor 52 senses one side of the dosage form, and second color sensor 64 senses the opposite side of the dosage form, provides positive identification of both sides of the dosage form. This has the advantage of independently confirming the orientation of the dosage form, and eliminates defective bi-layer dosage forms that might have only a single layer. If the dosage form is properly oriented, the system will allow the laser to drill the dosage form. Dosage forms that are not correctly oriented will not be drilled and are rejected at the end of the second link conveyor.

The second link conveyor transports the dosage forms to laser drilling station 30 where properly oriented dosage forms are drilled by the laser. The second link conveyor transports the dosage forms incrementally in a start/stop fashion during the drilling process, and includes an indexing sensor 78 to accurately position the dosage form at drilling station 30. Like links 40, each link 66 has a sensor notch formed in its side. Indexing sensor 78 is positioned adjacent to laser drilling station 30 to determine when a sensor notch is present. Data from indexing sensor 78 is sent to PLC 12 to position the link accurately for drilling of the dosage form and to coordinate movement of the second link conveyor with firing of the laser so as to drill the dosage form at the proper location. PLC 12 advances motor 72 to move the dosage form into laser drilling station 30, slows and then stops the second link conveyor in response to a signal from indexing sensor 78, fires the laser, and then advances the second link conveyor to move another dosage form into position for drilling.

The laser delivery assembly used to drill the opening(s) in the coating comprises a laser-generator, a beam delivery assembly and a debris removal assembly. The laser-generator includes laser 76 used to form openings through the coating. Any conventional laser capable of drilling holes through pharmaceutical coatings at a sufficiently rapid rate may be used. However, the inventors have found that lasers providing a sharp "Top Hat" or square wave energy distribution profile are preferred over those that provide a Gaussian energy distribution profile. One such laser is a TEA $CO_2$ pulsed laser, such as a 3150 IMPACT® $CO_2$ laser (200 watt, 150 Hz) manufactured by Lumonics, Inc. of Ottawa, Canada. The TEA $CO_2$ laser drills holes through the coating through photoablation. Laser 76 may include any other subsystems required for its performance, such as a cooling system such as a recirculating water chiller manufactured by VWR Scientific Products (Model No. 1177P) of Westchester, Pa.

Figure 9:
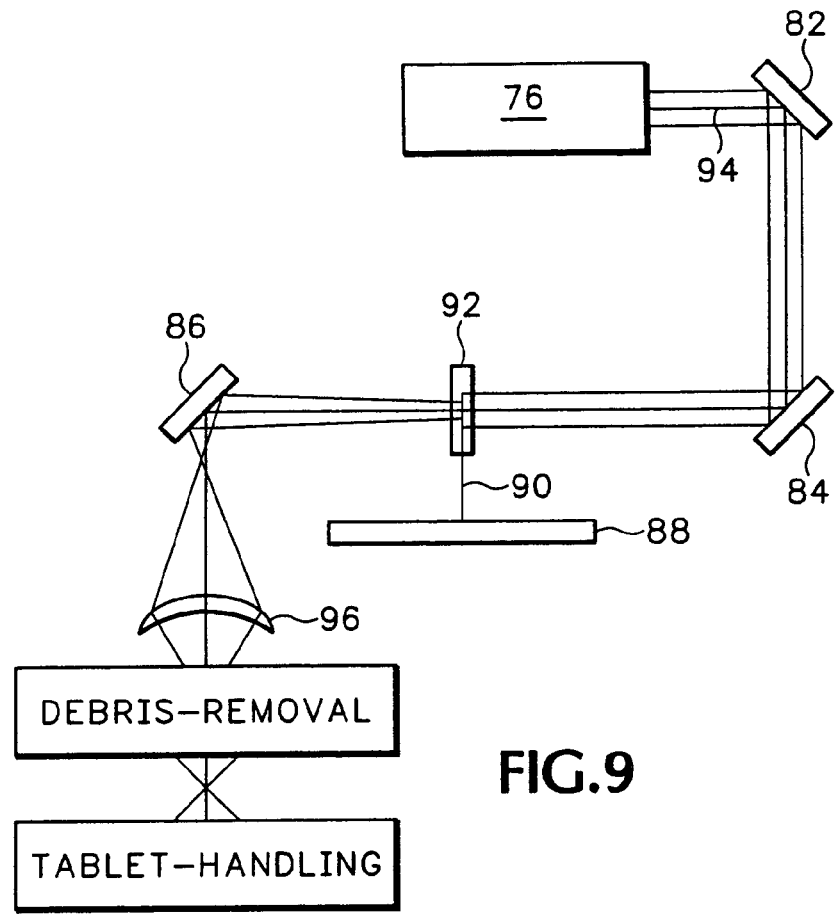
FIG. 9 is a schematic of certain aspects of the laser delivery assembly.

The laser beam delivery assembly directs the laser beam to the laser drilling station and determines the size, shape, and placement of the openings in the coating. As shown schematically in FIG. 9, laser beam delivery assembly includes mirrors 82, 84, and 86 to direct the beam; optical rail 88 to control demagnification; adjustable mask holder 90; and beam-sizing and beam-shaping steel mask 92. Laser beam 94 exits laser 76 and is reflected downward 90° by first mirror 82, then travels inside a 2.1-inch stainless steel tube to second mirror 84, which reflects the laser beam by another 90° toward optical rail 88. Optical rail 88 and adjustable mask holder 90 are housed within an enclosure with redundant safety interlocks. Laser beam 94 passes through steel mask 92 that is provided with a cut-out pattern that sizes and shapes the laser beam, allowing the formation of any number of holes or hole shapes, from slits to round openings. Alternatively, other conventional systems may be used to determine the location or number of holes, such as movable mirrors mounted on an x-y controller. Laser beam 94 then travels to third mirror 86, located inside lens assembly 96. Lens assembly 96 includes one or more lenses to focus the laser beam onto the coating of the dosage form. Lens assembly 96 may be a conventional laser-focusing device, such as an ACC Head from Laser Mechanisms, Inc. of Farmington Hills, Mich.

The photoablation process of laser drilling produces debris such as coating particles and waste gases. Accordingly, the laser system is also provided with a debris-removal assembly surrounding the dosage form during drilling to remove debris and gases produced when the laser forms an opening in the coating of the dosage form. Debris and gases are removed by creating a partial vacuum in the area of laser impact. In addition, a sweep gas such as air or nitrogen may emanate adjacent the lens in lens assembly 96 to prevent debris from coating the lens. Referring to FIGS. 2 and 10–12, the debris-removal assembly consists of debris enclosure 98, debris-removal filter 100, and a vacuum mechanism for removing debris and waste gases, such as regenerative blower 102. FIG. 2 shows the location of regenerative blower 102 and debris-removal filter 100. Debris is transported from debris enclosure 98 to debris-removal filter 100 housed within a filter canister. Clean air passing through debris-removal filter 100 is exhausted from regenerative blower 102.

Figure 10:
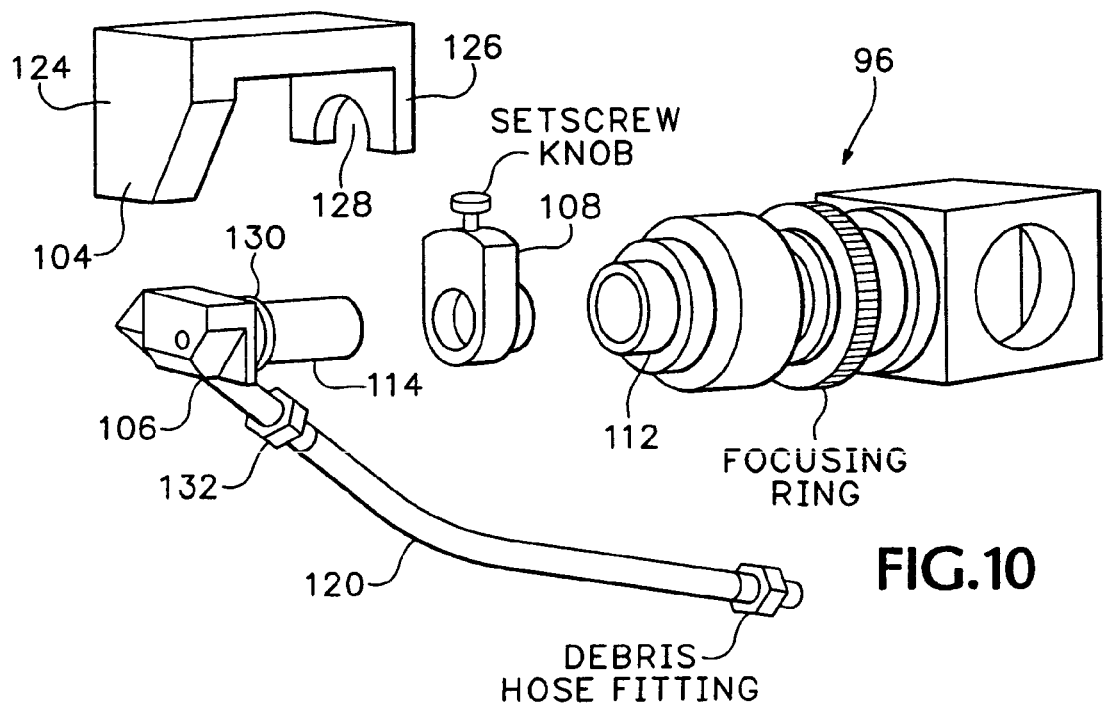
FIG. 10 is an exploded view of the debris enclosure and lens assembly.

Referring to FIGS. 10–11, debris enclosure 98 comprises a mounting bracket 104, debris head 106 and slip joint 108. Lens assembly 96 is located opposite track 70 of the second link conveyor so that laser beam 94 passes through lens assembly 96 and is directed toward the face of the dosage form to be drilled. Debris enclosure 98 extends from lens assembly 98 and around the dosage form. As described in more detail below, debris enclosure 98 surrounds the end of the lens assembly, yet still allows the lens assembly to move toward and away from the dosage form.

Sweep inlet 110 is located on lens assembly 96 adjacent to the lens, and is in fluid communication with a sweep gas source (not shown) that allows sweep gas to flow into the debris-removal system at a location between the lens and the dosage form. Slip-joint 108 is mounted by a set screw to lens tip 112, which is in a housing located at the end of lens assembly 96. Slip joint 108 has an internal bore for slidably receiving the rear end 114 of debris head 106, so that debris head 106 is held in sliding engagement with slip joint 108.

As shown in FIG. 12, the rear end 114 of debris head 106 defines a central channel 123 to allow the laser beam to travel through debris head 106 from its rear end 114 and out of its front end 116. Debris head 106 also includes an outlet 118 that is connected to debris hose 120, which in turn is in fluid communication with regenerative blower 102 and debris-removal filter 100. In use, a sweep gas enters sweep inlet 110 and passes through the rear end 114 of debris head 106 to prevent debris from collecting within lens assembly 96. Sweep gas, waste gases and debris are swept out of debris head 106 through outlet 118 and into debris hose 120.

In order to facilitate efficient removal of debris from dosage form 18, the surfaces of internal channel 122 of outlet 118 are radiused at the intersection of channel 122 with channel 123. In addition, three small bores 123a ranging in size from about 1/32 to 1/8-inch are located in debris head 106 and in channel 123 near the intersection of channel 123 with channel 122. One of the bores is generally aligned with channel 122, while the other two bores are arranged perpendicular thereto. These small bores 123a permit fluid communication between the inside and the outside of debris head 106, which permits ambient air to be drawn into channel 123 to dry the debris entering debris head 106 and to direct the debris into channel 122 of outlet portion 118.

Mounting bracket 104 forms a substantially enclosed area around dosage form 18 and maintains debris head 106 in a fixed position relative to the dosage form being drilled. Mount end 124 of mounting bracket 104 is attached with several screws to track 70 on the side opposite from lens assembly 96. Mounting bracket 104 extends over track 70 and dosage form 18. The positioning end 126 of mounting bracket 104 defines holding slot 128 for receiving debris head 106. Debris head 106 has an annular collar 130 and defines an annular groove 132 for receiving holding slot 128 of the positioning end 126 of mounting bracket 104. During assembly, debris head 106 is positioned so that the positioning end 126 of mounting bracket 104 is received within annular groove 132. Mounting bracket 104 maintains a small gap between debris head 106 and the face of dosage form 18. During focusing of lens assembly 96, lens assembly 96 and slip joint 108 move toward and away from the second link conveyor. Because debris head 106 is held in sliding engagement with the slip joint 108, mounting bracket 104 holds debris head 106 in a fixed position relative to dosage form 18 regardless of the position of lens assembly 96. Debris head 106 thus provides uniform removal of debris notwithstanding movement of lens assembly 96 during focusing. Mounting bracket 104, debris head 106 and slip joint 108 together form debris enclosure 98 which extends from lens assembly 96 and around dosage form 18, and which maintains the enclosure surrounding the end of lens assembly 96 even as it moves toward and away from dosage form 18.

Referring to FIGS. 4 and 13–16, after the dosage form is drilled, the second link conveyor transports the dosage forms to a quality control station 134. At quality control station 134, image analysis is conducted to verify that the diameter, location and completeness of the drilled openings in the dosage form are correct. Dosage forms that pass this quality control check continue on to accept bin 32, while those that fail are ejected at second rejection station 150.

Referring to FIGS. 13–16, quality control station 134 comprises digital camera 136 mounted adjacent to the second link conveyor and an illumination source 138. Camera 136 is operatively connected to PLC 12 to provide data regarding the dosage forms to the PLC. Camera 136 takes a picture of the dosage form to ensure the opening(s) are completely through the coating and are of the right shape and size. When a dosage form is stationary in front of camera 136 as indicated by the PLC, camera 136 is triggered to capture the image of the dosage form. Camera 136 is mounted on an xyz-axis positioner 137 to allow its position to be finely adjusted.

Camera 136 acquires a high-resolution image of each dosage form 18. The camera used to perform the image analysis may be any digital camera with sufficient resolution to allow image analysis of the entire dosage form including the drilled opening(s). The outer diameter of the dosage form may range from 3 to 13 mm, and is typically about 10 mm. The drilled openings may be as small as 200 µm in diameter, and therefore the camera should have sufficient resolution to distinguish the opening from small surface features. An exemplary optical quality control camera 136 is a Model 630 Smartimage Sensor digital camera available from DVT of Atlanta, Ga.

A high contrast image between opening 26 and the undrilled coating 24 of dosage form 18 (FIG. 3) facilitates image analysis by the camera. To achieve a high contrast image, the quality control system uses a low angle diffused illumination source 138 to illuminate the dosage form. As shown in FIGS. 13–16, illumination source 138 comprises a base 140 mounted adjacent the second link conveyor. Base 140 has a central opening 142 through which camera 136 views the dosage form. Light ring 144 is mounted to base 140 adjacent central opening 142. Light ring 144 has an outer rim 146 and an inner portion 147 and is preferably formed of clear plastic to provide uniform, diffuse illumination of the dosage form, and is illuminated from behind by four small lights 148. Outer rim 146 of light ring 144 is mounted behind the front 141 of base 140, while inner portion 147 is located in the opening 142. Light ring 144 thus provides diffuse illumination through central opening 142 and minimizes "hot spot" reflections of light on the coating's surface that might otherwise result from direct illumination of the dosage form.

Base 140 is mounted relative to dosage form 18 so that light ring 144 provides low angle light that is shined almost tangentially to the drilled opening(s) in the dosage form. As shown in FIG. 15, the included angle θ between (i) a line connecting the interior of the inner portion 147 of light ring 144 and the center of the dosage form 18 and (ii) a vertical line is preferably less than 45°, more preferably less than 20°, and most preferably less than 10°. This angle both highlights the edges and shades the bottoms of the drilled opening(s), maximizing the contrast for camera 136. Base 140 is moveable toward and away from the second link conveyor to allow adjustment of the illumination angle.

Image analysis is performed using computational software that may be included in camera 136; however, the software could also be stored in PLC 12 or in another computer peripheral device. The software analyzes the digital image, identifies the opening(s), finds the center of the opening(s), and measures its radius to determine whether it meets specifications. Any conventional image analysis software capable of making such determinations may be used.

In one embodiment, the software finds a drilled opening by identifying a "blob" or shape (usually a circle) that contrasts with the background. The software ignores smaller shapes during this step to minimize the misidentification of small surface features as drilled opening(s). For example, when analyzing drilled opening(s) that are 900 µm in diameter, the software may ignore features that are less than 200 µm in diameter. The shape is then analyzed by the software to determine whether it meets the drilling specifications. The software determines the position of the center of the shape and its symmetry, which may be assigned a relative value, for example ranging from 0 (indicating most asymmetric) to 1 (indicating most symmetric). The software also measures the average radius of the shape by calculating the distance from the center of the shape to an area of high contrast (the dosage form coating) along several radial lines, and averaging the result.

Camera 136 may also be calibrated to permit the determination of the actual size and actual radius of the drilled opening(s). To calibrate the camera, the drilled opening in a dosage form may be measured using a scanning electron microscope or other device capable of making such small measurements. The opening in the dosage form may then be imaged by the quality control camera system and the radius in pixels of the putative opening may be determined in order to determine the relationship between a pixel and a unit of measurement. For example, if the actual diameter of a drilled opening is measured to be to be 750 µm and the corresponding image of the opening is found to have a diameter of 50 pixels, each pixel would correspond to 15 µm.

After analyzing the image, the software compares the characteristic values of the image with the required opening specifications to determine whether the drilled opening is acceptable. PLC 12, camera 136, or both may store in memory a variety of different image specifications for the dosage form being drilled. The specifications may include the opening's location, size, completeness, symmetry and number of openings. An exemplary set of specifications may require an opening diameter of 900 µm±200 µm, a symmetry value greater than 0.85, and only one opening. Acceptable values for opening size and symmetry may be determined by comparing known good quality drilled dosage forms to drilled dosage forms that yielded poor quality dosage forms. After comparing the image to the required specifications for the opening, camera 136 sends a signal to the PLC indicating whether to accept or reject the dosage form. Rejected dosage forms are ejected at second rejection station 150.

Referring again to FIG. 4, after imaging, the second link conveyor transports the drilled and inspected dosage forms to second rejection station 150 located near the top of the second link conveyor. Like the first rejection station 53, second rejection station 150 ejects dosage forms from the second link conveyor which were rejected either by second color sensor 64 or by the quality control station 134. Second rejection station 150 may be any device capable of removing or ejecting the dosage form from the second link conveyor in response to data received from second color sensor 64 or from the quality control station 134. PLC 12 determines when a rejected dosage form is positioned at second rejection station 150. In the embodiment shown in FIG. 4, second rejection station 150 utilizes a selectively controllable air jet port (not shown) located beneath link 66. As the link 66 containing a rejected dosage form passes over the air jet port, a short burst of air is activated by PLC 12 to eject the dosage form into chute 154 that transports the rejected dosage form to a reject bin 156. The opening of chute 154 is preferably shaped and positioned so that rejected dosage forms do not bounce off it and back onto the second link conveyor. Second rejection station 150 may also include a sensor (not shown) located in chute 154 or in reject bin 156 to verify that rejected dosage forms have traveled down chute 154 and into reject bin 156. Dosage forms which pass the second rejection station are transported around the end 158 of the second link conveyor to the final dosage form accept chute 160. The accepted dosage forms pass through the accept chute 160 to an accept bin 32 where they are collected.

In summary, the laser drilling system of the present invention provides automated, rapid drilling of the coating of dosage forms at a rate of up to 5,000 dosage forms per hour. Each dosage form is checked twice by two independent color sensors to insure that the correct side of the dosage form is drilled. A debris removal assembly reduces buildup of and minimizes exposure to debris. Following drilling, each dosage form is analyzed using a quality control station to insure that each dosage form was correctly drilled.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

The invention claimed is:

1. A pharmaceutical laser drilling system for creating an opening in a coating on a dosage form having a first side and a second side, said system comprising:
   (a) a laser drilling station;
   (b) a laser capable of producing a laser beam, said laser beam being conducted through a laser beam delivery assembly capable of focusing said laser beam at said laser drilling station;
   (c) a first link conveyor comprising a plurality of first links, each of said first links being capable of receiving a dosage form;
   (d) a second link conveyor comprising a plurality of second links, each of said second links being capable of receiving said dosage form, said second link conveyor being operatively interconnected with said first link conveyor to receive said dosage form from said first link conveyor and capable of transporting said dosage form to said laser drilling station;
   (e) a first color sensor located adjacent said first link conveyor and capable of sensing the color of at least one of said first side and said second side of said dosage form and of generating a signal representative of the color; and
   (f) a rejection station located along said first link conveyor capable of ejecting said dosage form in response to said signal generated by said first color sensor.

2. The system of claim 1, further comprising a second color sensor located adjacent said second link conveyor and capable of sensing the color of at least one of said first side and said second side of said dosage form and generating another signal representative of the color.

3. The system of claim 2 wherein said first color sensor senses the color of said first side of said dosage form and said second color sensor senses the color of said second side of said dosage form.

4. The system of claim 2 wherein said second link conveyor further comprises a rejection station capable of ejecting said dosage form in response to said signal generated by said second color sensor.

* * * * *